United States Patent [19]

Farina

[11] Patent Number: 4,549,183

[45] Date of Patent: Oct. 22, 1985

[54] INTERFERENCE SUPPRESSOR FOR AN ELECTRONICALLY OR MECHANICALLY SCANNING MONOPULSE RADAR GENERATING SUM AND DIFFERENCE SIGNALS FROM RECEIVED MICROWAVE ENERGY

[75] Inventor: Alfonso Farina, Rome, Italy

[73] Assignee: Selenia SpA, Rome, Italy

[21] Appl. No.: 404,236

[22] Filed: Aug. 2, 1982

[51] Int. Cl.⁴ .......................... G01S 13/44; G01S 7/28
[52] U.S. Cl. .................................. 343/7 A; 343/16 M
[58] Field of Search ................. 343/7 A, 16 M, 18 E, 343/8

[56] References Cited

U.S. PATENT DOCUMENTS

| 3,438,044 | 4/1969 | Elia et al. | 343/16 M X |
|---|---|---|---|
| 3,449,745 | 6/1969 | Holt, Jr. | 343/16 M |
| 3,992,710 | 11/1976 | Gabriele et al. | 343/7 A X |
| 4,011,564 | 3/1977 | Gulick, Jr. | 343/7 A X |
| 4,028,708 | 6/1977 | Woodward | 343/16 M X |
| 4,044,359 | 8/1977 | Applebaum et al. | 343/18 E X |
| 4,168,500 | 9/1979 | Brassaw | 343/16 M X |
| 4,215,344 | 7/1980 | Phillips, Jr. | 343/18 E |
| 4,305,074 | 12/1981 | Barzana et al. | 343/7 A |

Primary Examiner—T. H. Tubbesing
Assistant Examiner—Brian S. Steinberger
Attorney, Agent, or Firm—Karl F. Ross; Herbert Dubno

[57] ABSTRACT

An electronically or mechanically scanning monopulse radar has an antenna feeding incident microwave energy contaminated by jamming signal to a processor which has a sum channel and one or two difference channels generating a raw sum signal $\Sigma$ along with a raw azimuthal difference signal $\Delta_\theta$ and/or a raw elevational difference signal $\Delta_\phi$. Each channel includes an algebraic adder subtracting from its own raw output signal a contamination signal representing estimated disturbance which is derived with the aid of an adaptive cancellation loop from the raw output signal or signals of the other channel or channels, thereby producing a purged sum signal $\Sigma'$ as well as one or two purged difference signals $\Delta'_\theta$, $\Delta'_\phi$. The purged output signal of each channel is fed back to the corresponding cancellation loop for correlation with the raw output signal or signals from the other channel or channels.

3 Claims, 3 Drawing Figures

INTERFERENCE SUPPRESSOR FOR AN ELECTRONICALLY OR MECHANICALLY SCANNING MONOPULSE RADAR GENERATING SUM AND DIFFERENCE SIGNALS FROM RECEIVED MICROWAVE ENERGY

FIELD OF THE INVENTION

My present invention relates to a system for the adaptive suppression of interferences from one or more jammers in the receiving section of a signal processor of an electronically or mechanically scanning radar of the monopulse type.

BACKGROUND OF THE INVENTION

Microwave energy reflected by a target and incident on a radar antenna along a main lobe of its radiation pattern may be encumbered by interfering radiation from one or more jammers picked up along side lobes of that pattern. The superimposition of the interfering signals upon the incoming echoes creates disturbances in the evaluation of the echoes which may disorient the radar relatively to a target being tracked or searched for.

In the case of a mechanically scanning antenna it has already been proposed to suppress these interferences by the provision of ancillary antennas flanking the main antenna and participating in its scanning motion, these ancillary antennas being oriented along the side lobes of the main radiation or beam pattern from which interfering signals are received. The associated processor, in its receiving section, treats the collateral signals emitted by these ancillary antennas as representative of estimated disturbance and subtracts them from the raw output signal of the main antenna to produce a useful signal purged to a greater or lesser degree from these interferences.

This mode of operation, which reduces the gain of the main antenna in the directions of incidence of the interfering radiation, requires a number of ancillary antennas at least equal to the number of jammers whose signals are to be suppressed, along with as many auxiliary channels in the processor in which the collateral signals from the ancillary antennas are properly weighted. The same technique can be used in the case of an electronically scanning main antenna with a phased array of elemental radiators whose individual output signals are weighted by phase shifters in the principal channel of the processor, in conformity with the sweep of the radiation pattern, as is well known in the art.

A drawback of the method just described is the fact that the ancillary antennas have their phase centers necessarily offset from that of the main antenna by a distance greater than half the width of the effective area in which the desired incident radiation is being collected by a rotating reflector or by the array of elemental radiators. This offset, more fully discussed in my copending application Ser. No. 404,236 of even date, decorrelates the interfering signals processed in the principal and auxiliary channels so as to impair the suppression of the resulting disturbances.

With an electronically scanning antenna the disturbances could also be spatially filtered out by modifying the weighting coefficients for the output signals of all the elemental radiators so as to reduce the antenna gain in the suspected direction or directions of incidence of the jamming signals. This latter method, while more effectively suppressing the interferences, is rather cumbersome since it requires individual processing channels and weighting circuits for all the elemental radiators.

In a monopulse radar designed to pinpoint the location of a target reflecting the emitted radar pulses, the returning echo pulses intercepted at different locations of an antenna array are combined cophasally and antiphasally to yield a sum signal $\Sigma$ and, usually, a pair of difference signals $\Delta_\theta$ and $\Delta_\theta$ whose magnitudes relative to that of the sum signal respectively depend on the azimuthal and the elevational angle of the incident radiation. In some instances just a single difference signal is generated, as where the antenna is mechanically rotated about a vertical axis and only the angle of elevation of an encountered target is of interest.

When an interfering signal from a jammer is superimposed upon the incoming echo pulses, the resulting change in the magnitudes of the sum and difference signals will tend to falsify the determination of the angular coordinates by the processor of the radar. The suppression of these interferences is therefore important in keeping the boresight axis of the antenna trained upon a target being tracked, for example.

In my above-identified copending application I have disclosed an interference-suppressing system in which one or more ancillary antennas are disposed within the effective area of a collector of incident microwave energy forming part of a main antenna. The ancillary antennas, trained upon respective side lobes of the overall radialtion or beam pattern, may be constituted by subgroups of elemental radiators of a phased array of such radiators occupying the collector area. Such an arrangement greatly reduces the aforementioned offset between the phase centers of the main and ancillary antennas, thus enhancing the suppression of interferences. The number of radiators included in each subgroup, which neither participate in the formation of an outgoing beam during transmission nor contribute to the main output signal during reception, is only a small fraction of the total number of radiators in the array; their exclusion from these operations nevertheless affects—albeit to a minor extent—the configuration of that pattern.

OBJECT OF THE INVENTION

The object of my present invention is to eliminate the need, in a monopulse radar, for any ancillary antennas either outside or inside the effective microwave-receiving area regardless of the direction of incidence of the interfering signals to be suppressed.

SUMMARY OF THE INVENTION

I have found, pursuant to my present invention, that the raw output signals $\Sigma$ and $\Delta$ generated on reception by the sum and difference channels of a monopulse radar contain components of interfering signals which, by suitable cross-correlation, yield contamination signals that represent estimates of disturbance and can be subtracted from the corresponding raw output signals to provide respective purged output signals $\Sigma'$, $\Delta'$.

Thus, the sum and difference channels in a receiving section of a processor of a monopulse radar embodying my invention have output leads each provided with a subtractor to which a contamination signal is fed by an associated disturbance estimator for converting their raw output signals $\Sigma$ and $\Delta$ into respective purged signals $\Sigma'$ and $\Delta'$, each disturbance estimator including an adaptive loop connected to the output lead of the associated channel at a point downstream of its subtractor for receiving the purged output signal of that channel and further connected to the output lead of each remaining channel at a point upstream of its subtractor for receiving the corresponding raw output signal. My invention, therefore, utilizes only the two or three channels already existing in such a processor for the purging of their output signals, without the need for any modification of the antenna structure or its control circuits.

BRIEF DESCRIPTION OF THE DRAWING

The above and other features of my invention will now be described in detail with reference to the accompanying drawing in which.

SPECIFIC DESCRIPTION

Figure 1:
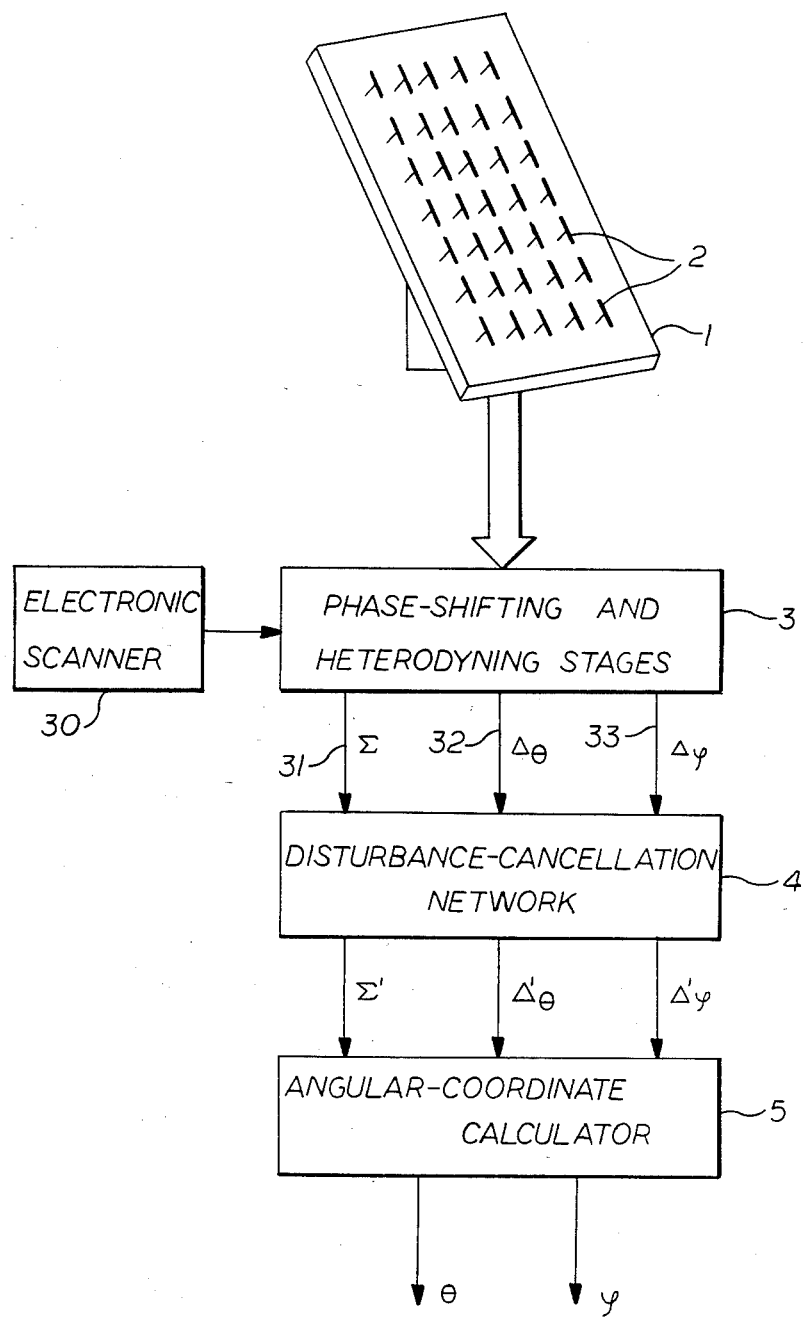
FIG. 1 is a diagrammatic perspective view of an antenna of the phased-array type, this antenna forming part of a monopulse radar with a receiving section including several processing networks shown in block form.

The monopulse radar schematically represented in FIG. 1 comprises an antenna 1 with a phased array of elemental radiators 2, i.e. dipoles, which are used for the reception and possibly also for the transmission—with the aid of a suitable duplexer—of pulsed microwave energy in conformity with a certain beam pattern. A network 3, forming part of a receiving section of an associated processor, contains a multiplicity of phase shifters connected in the individual output circuits of the several dipoles 2 for the establishment of that pattern and for the extraction of a sum signal $\Sigma$, an azimuthal difference signal $\Delta_\theta$ and an elevational difference signal $\Delta_\phi$ from the received radiation. The beam pattern may be angularly displaced in both the azimuthal and the elevational plane of the antenna 1 with the aid of an electronic scanner 30 controlling the individual phase shifters of network 3 as is well known in the art. This network also includes heterodyning stages for transposing the raw output signals of the single sum channel and the two difference channels to a lower frequency level.

Signals $\Sigma$, $\Delta_\theta$ and $\Delta_\phi$ are carried on output leads 31, 32 and 33 of the sum and difference channels and are fed to a disturbance-cancellation network 4, more fully described hereinafter with reference to FIG. 2, which delivers purged output signals $\Sigma'$, $\Delta'_\theta$ and $\Delta'_\phi$ to a calculator 5 determining the angular coordinates $\theta$ and $\phi$ of an echo-reflecting target. These coordinates can be displayed, in the usual manner, on a nonillustrated visualizer.

Figure 2:
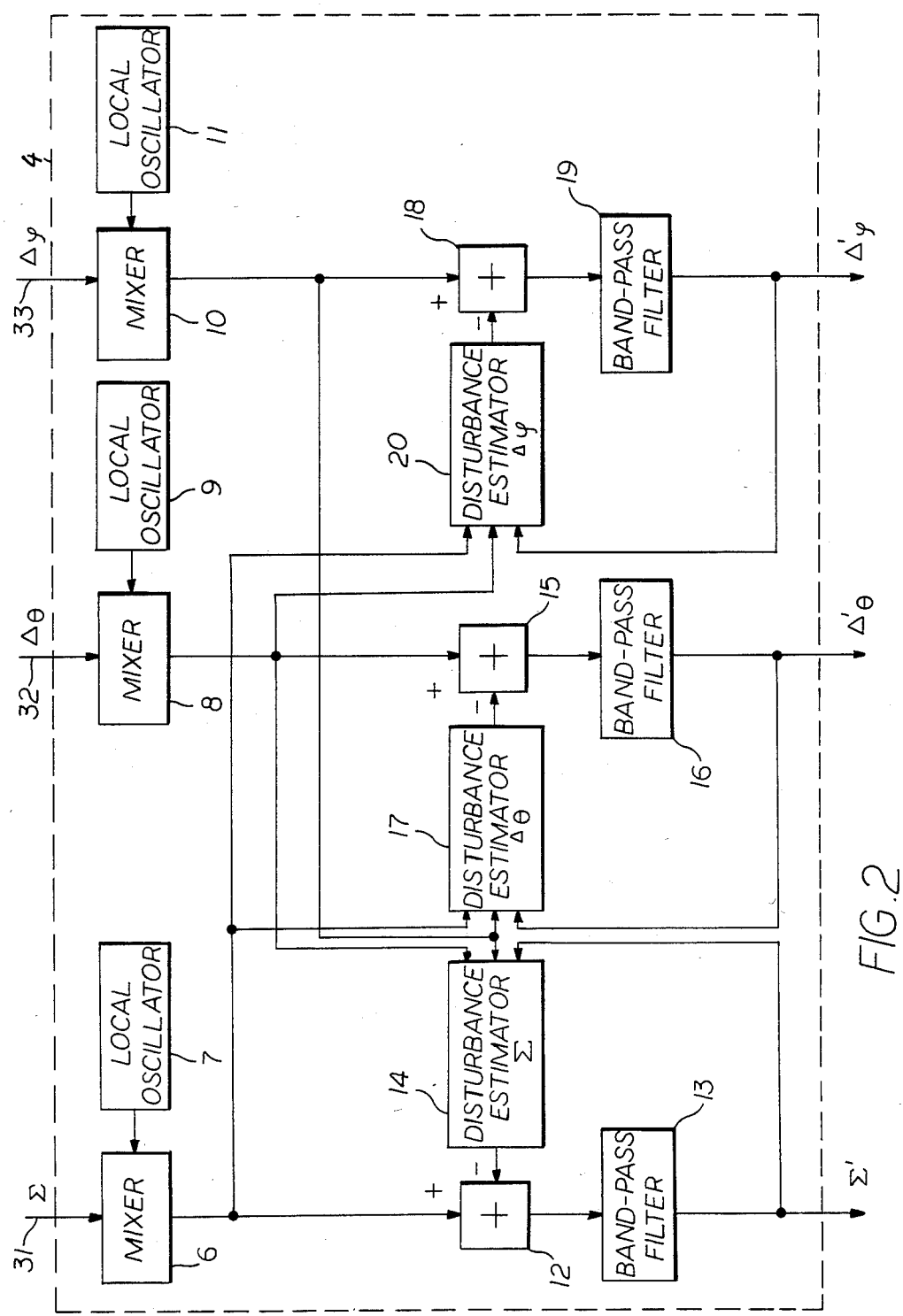
FIG. 2 is a more detailed block diagram of a disturbance-cancellation network included in that receiving section.

As shown in FIG. 2, disturbance canceler 4 comprises a set of three mixers 6, 8 and 10 which are connected on the one hand to output leads 31, 32, 33 and on the other hand to respective local oscillators 7, 9 and 11 for stepping the raw output signals $\Sigma$, $\Delta_\theta$ and $\Delta_\phi$ down to an intermediate-frequency level. Circuit elements 6–11 can, of course, be omitted if the raw output signals are already at that level on issuing from the network 3 of FIG. 1. There are further provided, for each processing channel, an algebraic adder 12, 15, 18 and a disturbance estimator 14, 17, 20, the latter being part of an adaptive cancellation loop for the respective adder which also includes a band-pass filter 13, 16, 19. The purged output signals $\Sigma'$, $\Delta'_\theta$ and $\Delta'_\phi$ are emitted by filters 13, 16 and 19, respectively, and are also fed back to the corresponding disturbance estimators 14, 17 and 20 in their cancellation loops. Each of these estimators has two further inputs connected to the signal paths of the respectively remaining two channels, namely to the outputs of mixers 8 and 10 in the case of estimator 14, to the outputs of mixers 10 and 6 in the case of estimator 17 and to the outputs of mixers 6 and 8 in the case of estimator 20. Estimator 14, therefore, receives the purged output signal $\Sigma'$ of its own channel and the raw output signals $\Delta_\theta$ and $\Delta_\phi$ of the other two channels; in an analogous manner, estimator 17 receives signals $\Delta'_\theta$, $\Sigma$ and $\Delta_\phi$ while estimator 20 receives signals $\Delta'_\phi$, $\Sigma$ and $\Delta_\theta$.

Figure 3:
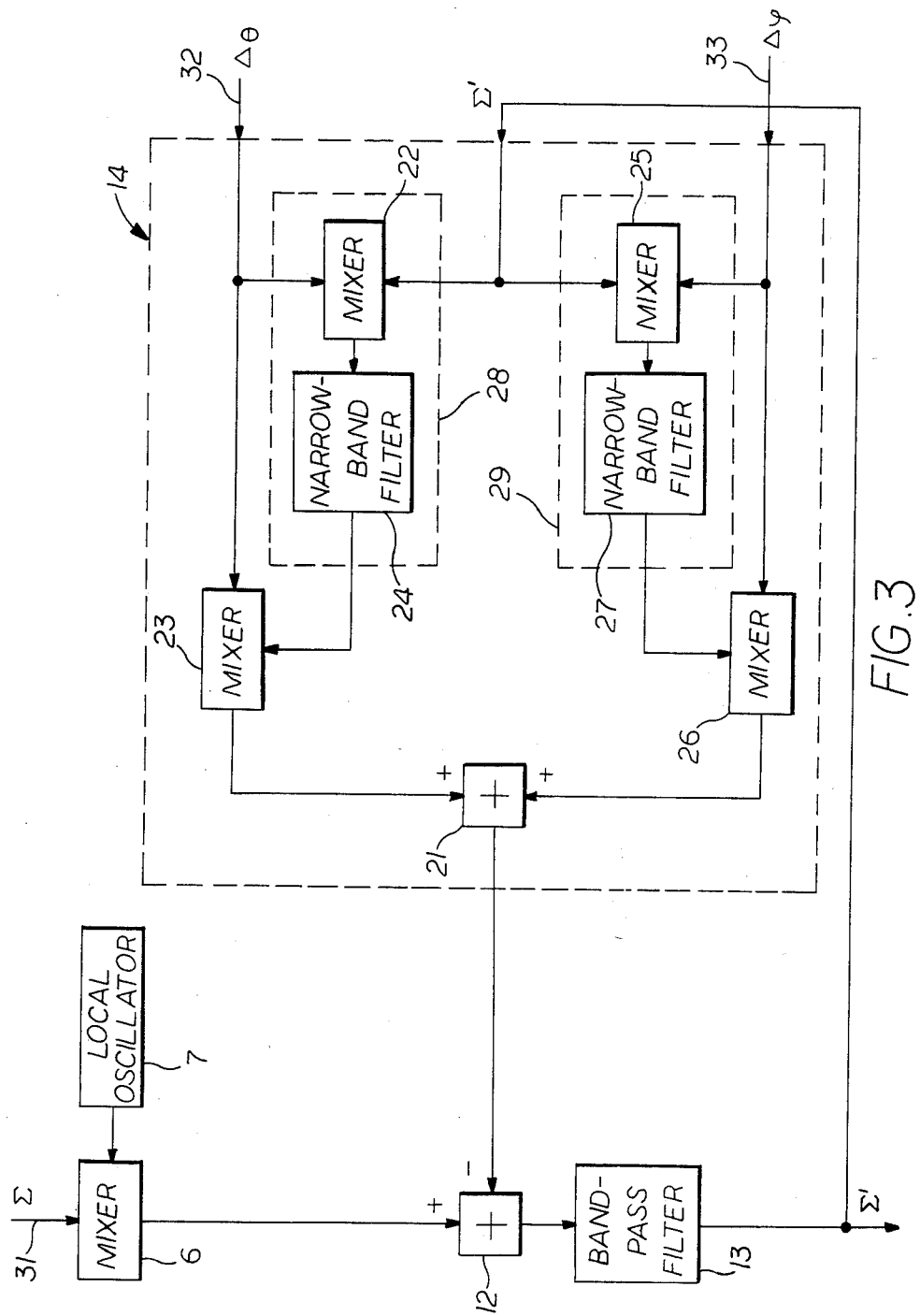
FIG. 3 is a more detailed block diagram of a disturbance estimator represented by one of the blocks of FIG. 2.

The structure of estimator 14, which of course is representative also of its mates 17 and 20, has been illustrated in greater detail in FIG. 3. As shown there, the estimator is divided into two halves each comprising a first mixer 22, 25 and a second mixer 23, 26; mixers 22 and 25 have inputs connected to the output of filter 13 for receiving the purged sum signal $\Sigma'$ therefrom. Another input of mixer 22 is connected in parallel with an input of mixer 23 to the output lead 32 of mixer 8, FIG. 2, for receiving the raw difference signal $\Delta_\theta$; a correlation signal emitted by mixer 22 is fed via a narrow-band filter 24, forming part of a cross-correlation loop 28, to another input of mixer 23. In an analogous manner, mixers 25 and 26 both receive the raw difference signal $\Delta_\phi$ from output lead 33 of mixer 10, FIG. 2, while mixer 25 has its output connected to another input of mixer 25 in a cross-correlation loop 29 including a narrow-band filter 27. The output signals of mixers 23 and 26 are summed in an internal adder 21 of disturbance estimator 14; their sum is transmitted as a contamination signal to the subtracting input of the algebraic adder 12 also receiving the raw sum signal $\Sigma$.

Since the phase centers of the groupings of dipoles 2 (FIG. 1) giving rise to the sum and difference signals virtually coincide, there is a high degree of correlation between the interfering signal components superimposed thereupon. Mixers 22 and 25 derive from this correlation the aforementioned corrective signals which are respectively integrated in filters 24 and 27 whose pass bands are much narrower than those of filters 13, 16 and 19. The time constants of these narrow-band filters 24 and 27 should substantially exceed the shortest periods within which the detected jamming signals can vary.

In principle, signals $\Sigma$, $\Delta_\theta$ and $\Delta_\phi$ could also be fed to cancellation network 4 at the video-frequency rather than at the intermediate-frequency level, with filters 24 and 27 of the low-pass instead of the band-pass type. The presence of an i-f carrier in the cross-correlation loops 28 and 29, however, stabilizes the operation against frequency drifts which could be caused by spurious d-c components issuing from mixers 22 and 25 in the absence of such a carrier.

Two jammers transmitting toward the antenna 1 of FIG. 1 will generally produce interfering components respectively dominating in the two difference signals $\Delta_\theta$ and $\Delta_\phi$ used for purging the sum signal $\Sigma$. These components are therefore separately correlated with their reference signal $\Sigma'$ in loops 28 and 29. The use of two such cross-correlation loops will enhance the disturbance-suppressing effect even in the presence of but a single jammer.

While the signals processed by the circuitry of FIGS. 2 and 3 are of analog nature, they could just as well be digitized with suitable modification of the evaluation system.

If the antenna 1 of FIG. 1 is rotated in its azimuthal plane and only the elevational difference signal $\Delta_\phi$ is generated by electronic scanning, the disturbance-cancellation network 4 will be simplified by the omission of disturbance estimator 17 and its associated subtractor 15 as well as band-pass filter 16 along with the corresponding inputs of estimators 14 and 20. These two estimators, furthermore, will each include only one cross-correlation loop, specifically the loop 29 of FIG. 3 in the case of block 14, and the internal adder 21 will also become superfluous as the contamination signal is directly emitted by mixer 26. The basic mode of operation, however, will still be the same. In an analogous manner, of course, the parts associated with the elevational difference channel will be omitted if only the azimuthal difference signal $\Delta_\theta$ is of interest.

Though I have described my invention with particular reference to an antenna of the phased-array type, it is also applicable to a monopulse radar with a mechanically scanning reflector-type antenna structure having microwave receivers whose output signals can be cophasally and antiphasally combined to produce a sum signal and one or two difference signals.

I claim:

1. In a monopulse radar wherein an antenna with a radiation pattern subjected to a scanning displacement feeds incident microwave energy contaminated by interfering radiation to a receiving section of a processor having a sum channel and at least one difference channel emitting respective raw output signals $\Sigma$ and $\Delta$, the combination therewith of cancellation means comprising a respective disturbance estimator associated with each of said channels and a subtractor in an output lead of each channel receiving a contamination signal from the associated disturbance estimator for converting the raw output signals $\Sigma$ and $\Delta$ into respective purged output signals $\Sigma'$ and $\Delta'$ of said sum and difference channels each disturbance estimator including an adaptive loop connected to the output lead of the associated channel at a point downstream of the subtractor thereof for receiving the purged output signal of said associated channel and further connected to the output lead of the respective other channel at a point upstream of the subtractor of the latter for receiving the raw output signal of said other channel, said adaptive loop of each disturbance estimator comprising a first and a second mixer with inputs connected in parallel to the respective other channel, said first mixer further receiving the purged output signal from the associated channel for generating a corrective signal fed via an integrator to said second mixer for modulating said contamination signal prior to transmission thereof to the associated subtractor, said processor being provided with two difference channels emitting raw signals $\Delta_\theta$ and $\Delta_\phi$ and respectively representing the azimuthal and elevational monopulse beams of incident radiation, the disturbance estimator of said sum channel further including an adder supplying the subtractor thereof with the sum of said raw signals $\Delta_\theta$ and $\Delta_\phi$ from said difference channel, each of said difference channels further including an adder supplying the subtractor thereof with the sum of said raw signal $\Sigma$ and the raw signal $\Delta_\phi$, $\Delta_\theta$ from the respective other difference channel for converting the raw signals $\Delta_\theta$ and $\Delta_\phi$ into respective purged signals $\Delta'_\theta$ and $\Delta'_\phi$.

2. The combination defined in claim 1 wherein said channels include heterodyning means for modulating received microwave signals upon an intermediate-frequency carrier, said integrator comprising a narrowband filter centered upon said carrier.

3. The combination defined in claim 1 or 2 wherein said antenna comprises a phased array of elemental radiators, said channels including phase-shifting means controlled by electronic scanning means for generating said raw output signals.

* * * * *